US008335301B2

(12) United States Patent
Laws et al.

(10) Patent No.: US 8,335,301 B2
(45) Date of Patent: Dec. 18, 2012

(54) VIDEO ON HOLD FOR VOIP SYSTEM

(75) Inventors: Ron D. Laws, Santa Clara, CA (US); Pascal R. Crausaz, San Jose, CA (US)

(73) Assignee: ShoreTel, Inc., Sunnyvale, CA (US)

(*) Notice: Subject to any disclaimer, the term of this patent is extended or adjusted under 35 U.S.C. 154(b) by 1251 days.

(21) Appl. No.: 11/966,818

(22) Filed: Dec. 28, 2007

(65) Prior Publication Data
US 2009/0168978 A1    Jul. 2, 2009

(51) Int. Cl.
*H04M 11/00* (2006.01)
(52) U.S. Cl. ............... 379/93.17; 379/93.04; 379/93.21; 379/93.35; 379/157; 379/215.01; 725/62; 725/106; 725/133; 725/141; 725/153; 709/204; 709/227; 709/232
(58) Field of Classification Search ............... 379/93.17, 379/215.01, 157, 93.35, 93.04, 93.21; 725/62, 725/106, 133, 141, 153; 709/204, 227, 232
See application file for complete search history.

(56) References Cited

U.S. PATENT DOCUMENTS

| | | | |
|---|---|---|---|
| 5,835,130 A | | 11/1998 | Read et al. |
| 6,020,916 A | * | 2/2000 | Gerszberg et al. ......... 348/14.07 |
| 2002/0136384 A1 | * | 9/2002 | McCormack et al. ... 379/215.01 |
| 2007/0294263 A1 | * | 12/2007 | Punj et al. ...................... 707/10 |

OTHER PUBLICATIONS

PCT International Search Report and Written Opinion, PCT/US08/88218, Mar. 27, 2009, 8 pages.

* cited by examiner

*Primary Examiner* — Vivian Chin
*Assistant Examiner* — Paul Kim
(74) *Attorney, Agent, or Firm* — Patent Law Works LLP (57) ABSTRACT

A system for placing a telephone call on hold and presenting video to the user that has been placed on hold comprises video on hold arbiter that either is a part of the server or the switch of an IP telephony system. The video on hold arbiter comprises a hold monitoring module, a switch interface module and a media source interface module. The video on hold arbiter monitors calls between parties for the selection of a hold signal indicating that a first caller is placing a second caller on hold. The video on hold arbiter then determines the capabilities of the first caller and the second caller, a source video signal and switches the call to a video-on-hold status. In the video-on-hold status, the video on hold arbiter provides a video signal to the caller on hold from the determined source video and matching the capabilities of the party on hold. Video on hold arbiter and monitors for an off hold signal. Once the off hold signal is detected, the video on hold arbiter reestablishes the video and audio connections between the parties. The present invention also includes a variety of methods including a method for initializing and configuring a video on hold system and a method for providing video content when a call is placed on hold.

15 Claims, 9 Drawing Sheets

VIDEO ON HOLD FOR VOIP SYSTEM

BACKGROUND OF THE INVENTION

1. Field of the Invention

The present invention relates telephony such as that using Voice over Internet Protocol (VoIP), in particular, distributed telephony systems that use VoIP handsets in conjunction with computer displays. Still more particularly, the present invention relates to new functionality for such system including a video on hold functionality.

2. Description of the Background Art

The prior art includes a variety of distributed telephony systems. Traditional switched network systems have given way to new telephony systems that use VoIP. These VoIP systems offer the same functionality as more traditional switched system such as the ability to transfer calls, put calls on hold, automated attendant functions, hunt groups, etc. These systems also offer additional functionality, for example, one feature with existing telephony systems is referred to as music on hold (MOH). Music on hold typically involves using a telephony system to play music to the called party that has been placed on hold. In today's world, existing telephony systems are limited to either playing music on hold or nothing (silence) when the party is placed on hold.

The new telephony systems that use VoIP offer a variety of services in addition to just audio communication. For example, interactive video is more and more common with unified communications systems that enable the party to converse using not only voice but video allowing for more face-to-face experience and enhancing the communication with the clues provided by the image of the party on the call.

SUMMARY OF THE INVENTION

The present invention overcomes the deficiencies and limitations of the prior art by providing a system and method for placing a telephone call on hold and presenting video to the user that has been placed on hold. In one embodiment, the present invention comprises video on hold arbiter that either is a part of the server or the switch of an IP telephony system. The video on hold arbiter comprises a hold monitoring module, a switch interface module and a media source interface module. The video on hold arbiter monitors calls between parties for the selection of a hold signal indicating that a first caller is placing a second caller on hold. The video on hold arbiter then determines the capabilities of the first caller and the second caller, a source video signal and switches the call to a video-on-hold status. In the video-on-hold status, the video on hold arbiter provides a video signal to the caller on hold from the determined source video and matching the capabilities of the party on hold. Video on hold arbiter and monitors for an off hold signal or termination of the call. Once the off hold signal is detected, the video on hold arbiter reestablishes the video and audio connections between the parties. The present invention also includes a variety of methods including a method for initializing and configuring a video on hold system and a method for providing video content when a call is placed on hold.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

A system and method for providing video on hold capabilities for a telephony system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive a data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise telephony systems have been developed. Enterprise telephony systems, which comprise a set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers and application services.

Figure 1:
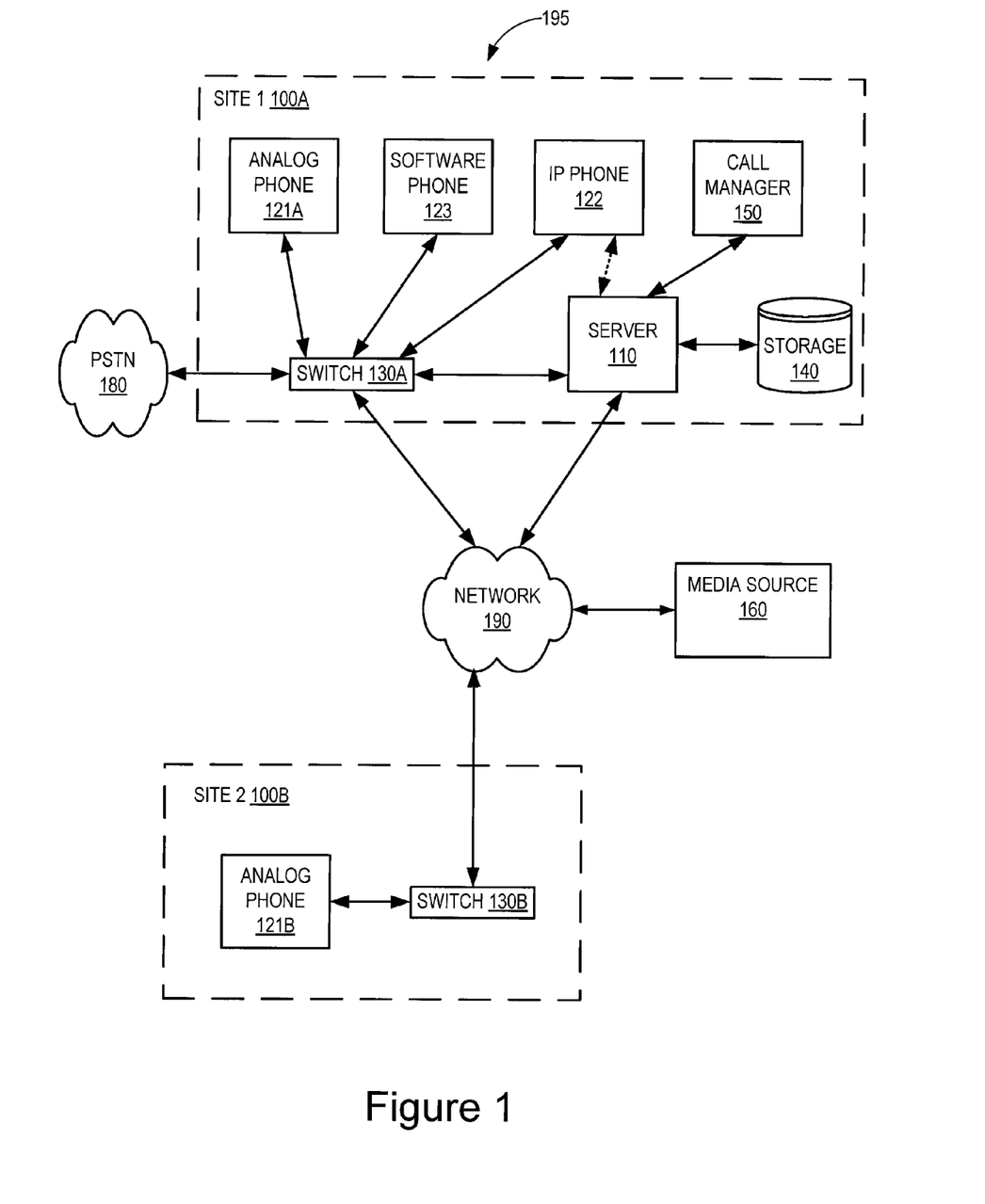
FIG. 1 is a high-level block diagram illustrating a functional view of a distributed telephony system according to one embodiment of the present invention.

FIG. 1 illustrates a block diagram of a distributed telephony system architecture, according to one embodiment of the present invention. The illustrated embodiment of architecture 195 includes a first site 100A and a second site 100B. As used herein, a site represents a grouping of resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The system 195 architecture in FIG. 1 is used only by way of example. While FIG. 1 illustrates two sites, the present invention applies to any system architecture containing one or more sites.

The first site 100A includes a server 110, a switch 130A, three endpoints (analog phone 121A, IP phone 122, and software phone 123), a device running a call manager software application 150 and a storage device 140. The switch 130A represents a Voice over Internet Protocol (VoIP) device to which a number of endpoints can be coupled, such as analog phones 121A, IP phones 122, and software phones (softphones) 123. In the illustrated embodiment, the switch 130A is coupled to the network 190. The switch 130A is also coupled to the public switched telephone network (PSTN) 180 via an analog or digital trunk line (e.g., a T1 or E1 interface). In the illustrated configuration, the switch 130A provides an interface for calls originating from or terminating on the PSTN 180.

An endpoint enables a user to carry on a phone call. Although in the illustrated embodiment the first site 100A has three endpoints (one analog phone 121A, one IP phone 122, and one softphone 123), in other embodiments the first site 100A has different numbers and types of endpoints. An endpoint is coupled to the switch 130, the server 110, or both. Each of the endpoints can also include a display device (not shown) that is used in conjunction with the phone of the endpoint.

An endpoint has a user interface to send data to and receive data from a user. The analog phone 121A has, for example, a Telephone User Interface (TUI) that sends data through a speaker and receives data through a microphone and a keypad. The IP phone 122 has, for example, both a TUI and a graphical user interface that sends data through a display device associated with the IP phone 122. In one embodiment, the IP phone's graphical user interface also receives data from a touch screen display device associated with the IP phone 122. The softphone 123 has, for example, a software application that runs on a computer and sends data through a display device and a speaker and receives data through a microphone, a keyboard, and a pointing device.

A device running a call manager software application 150, such as a computer, controls one or more endpoints with which it is associated. Call manager 150 offers a user an interface through which he can perform call-related functions. While shown as operational as a separate module in this embodiment and FIG. 1, those skilled in the art will recognize that in other embodiments, the call manager 150 may be operational as part of the switch 130.

Although in the illustrated embodiment the first site 100A has only one call manager 150, in other embodiments the first site 100A has a different number of call managers 150. Also, more than one call manager 150 can control the same endpoint. The association between a call manager 150 and an endpoint that it controls is accessed through the server 110.

The server 110 is configured to implement features or functions of the present invention. The server 110 is coupled to the network 190 and can also be coupled to one or more endpoints, such as IP phone 122 and softphone 123. The server 110 will be further discussed below with reference to FIGS. 2A and 3.

The storage device 140 contains directory information, including directory entries and associations between directories and phones. In one embodiment, the storage device 140 also contains information regarding the directory context of a phone. Alternatively, this information can be stored in the server 110. In one embodiment, directory context information includes one or more of the following: 1) a portion of a directory that is currently available for presentation (the portion could include, e.g., information from all entries versus information from entries that meet certain criteria); 2) a filter (if any) that was used to determine the entries in (1); 3) of the entries in (1), which entries are currently being presented by the phone; 4) of the entries in (3), which entry is currently navigated to; 5) what call function (if any) the directory was invoked during. Note that since the directory context specifies the information presented by the phone, storing the directory context enables later determination of what information is being presented by the phone.

Also, note that directory context information need not include all items (1)-(5). For example, if the entire directory and the filter (2) are known, the directory portion available for presentation (1) can be determined. Directory context information will be further explained below. In the illustrated embodiment, the storage device 140 is directly coupled to the server 110. In an alternate embodiment, the storage device 140 is coupled to the server 110 via the network 190.

One skilled in the art will appreciate that additional networking devices (not shown) can be added to the first site 100A, for example, if needed to support additional endpoints, servers 110 or other systems. For example, the first site 100A can include a second switch 130 and an edge router to couple the first site 100A to the network 190 and to provide local area connectivity for the first and second switches 130A, 130B. One skilled in the art will also recognize that numerous configurations of switches 130 and communications links are contemplated. For example, PSTN links can be coupled to multiple switches 130 at several points within the topology and soft-switches 130 can also be used.

The second site 100B similarly includes an endpoint (analog phone 121B) and a switch 130B. The configuration of the second site 100B demonstrates that a server is not required for each site. Switch 130B of the second site 100B can be managed by server 110 that is illustrated in the first site 100A. A call can involve more than one switch. For example, a call that originates from the PSTN 180 and terminates on an endpoint that is communicatively coupled to switch 130B of the second site 100B involves two switches: switch 130A of the first site 100A and switch 130B of the second site 100B. In addition, each switch 130A, 130B can be managed by a different server 110.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

The system 195 of the present invention also includes a media source 160 adapted for communication with the server 110 via the network 190. Under the direction and control this of the server 110, the call manager 150 or the switch 130, the media source 160 provides video information for display in conjunction with the use of any of the endpoints 121A, 123, 122 or 121B. The media source 160 and its operation will be described in more detail below with reference to FIGS. 5 and 6.

VOH Arbiter 260

Figure 2A:
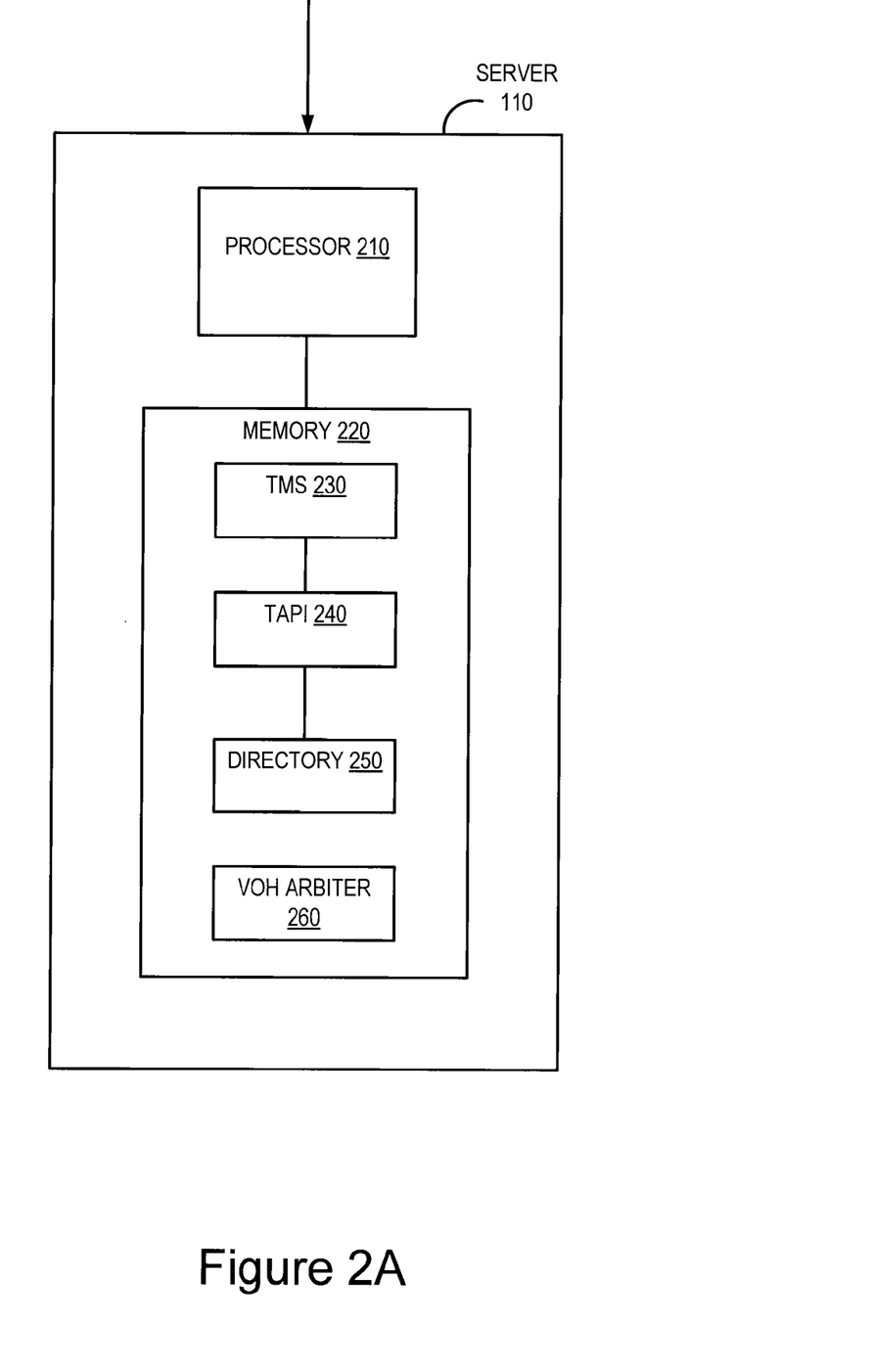
FIG. 2A is a block diagram illustrating a server according to one embodiment of the present invention.
Figure 2B:
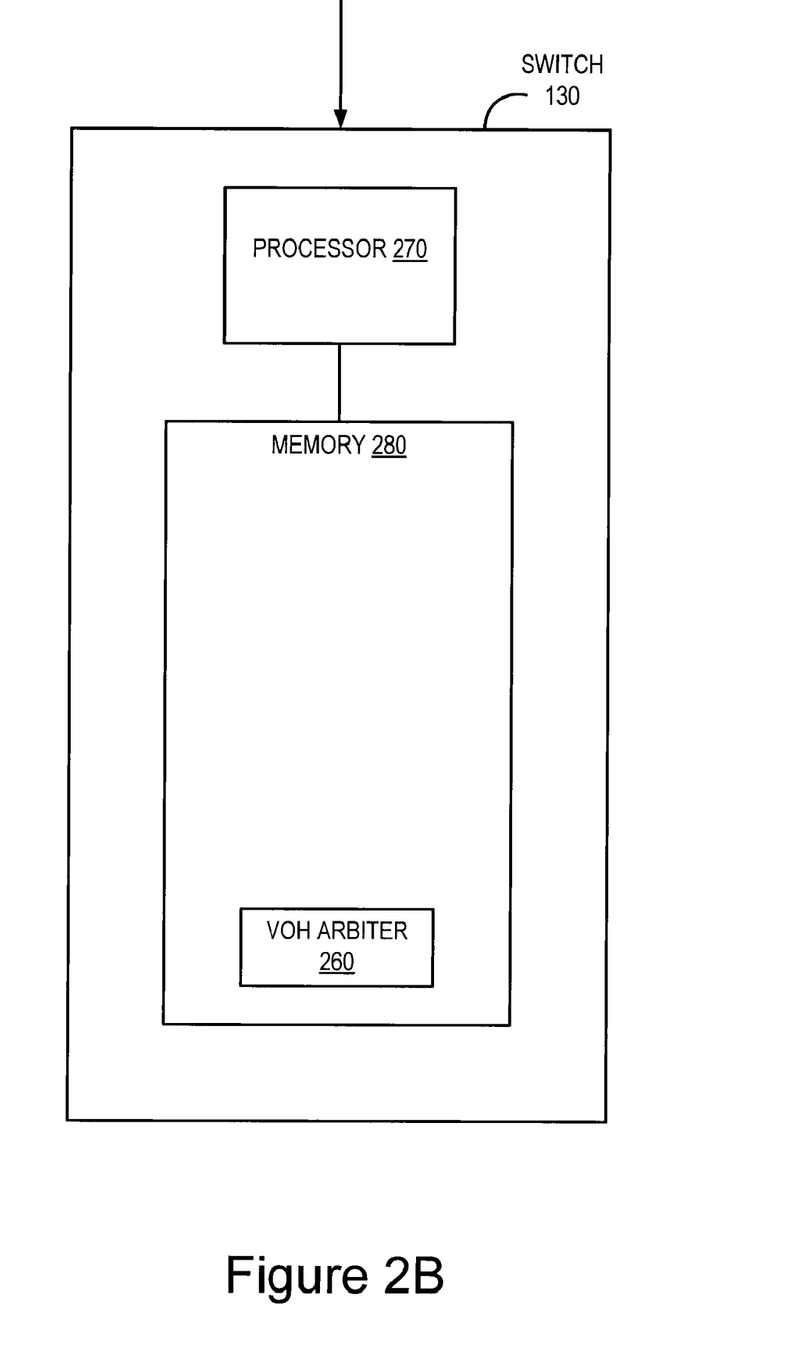
FIG. 2B is a block diagram illustrating a switch according to one embodiment of the present invention.

Referring now to FIGS. 2A and 2B, two embodiments of the present invention are shown. FIG. 2A shows an embodiment of the present invention in which a video on hold arbiter 260 is part of the software operational on the server 110. FIG. 2B shows another embodiment of the present invention in which the video on hold arbiter 260 is part of the software operational on the switch 130. Essentially, the present invention converts the server 110 or the switch 130 to a media proxy server for delivering video content on a call is placed on hold.

Referring now to FIG. 2A, is a block diagram of a server architecture according to one embodiment of the present invention is shown. In this embodiment, server 110 is configured to implement features or functions of the present invention. Server 110 includes a processor 210. The processor 210 can be a conventional processing device, such as a general-purpose microprocessor.

Server 110 also includes a memory 220. The memory 220 includes program instructions or functional units that implement features of the present invention. Specifically, the memory 220 includes a telephony management software (TMS) unit 230, a telephony application programming interface (TAPI) unit 240, a directory unit 250 and the video on hold arbiter 260.

In one embodiment, the memory 220 also includes one or more application units that interact with the TMS unit 230 and the TAPI unit 240 to enable a specific computer-integrated function. An application unit uses the TAPI unit 240 to exchange data with the TMS unit 230. The TMS unit 230 is able to communicate with and manage one or more switches 130. For example, with reference to FIG. 1, the TMS unit 230 included in the server 110 can manage the switches 130A, 130B. Through the TAPI unit 240, the TMS unit 230 presents an application with a computer-telephony integration (CTI) view of these switches 130A, 130B. This allows the application to manage the switches 130A, 130B. Such switches 130A, 130B operate without an associated TMS unit 230 if CTI features are not being used.

In the illustrated embodiment, the server 110 includes one application unit—directory unit 250. In general, the directory unit 250 enables a phone to access a directory and use the directory in conjunction with other phone functions. In one embodiment, directory unit 250 is implemented as a service that interacts with TMS unit 230. Communication or data exchange is between TMS unit 230 and directory unit 250. Although directory unit 250 is illustrated as executing on the server 110, directory unit 250 can be distributed among computing devices as is known to one of skill in the art. For example, the functionality enabled by directory unit 250 can be implemented in a client-server fashion by having the client (user's local system, such as a general-purpose computer or endpoint) perform some functions and having the server 110 (directory unit 250) perform others. As another example, some or all of the functionality enabled by directory unit 250 can be implemented by having a switch 130 perform some or all functions.

In the illustrated embodiment, the server 110 includes the video on hold arbiter 260. The video on hold arbiter 260 is software or routines for placing a telephone call on hold and presenting video to the user that has been placed on hold. The video on hold arbiter 260 monitors calls between parties for the selection of a hold signal indicating that a first caller is placing a second caller on hold. The video on hold arbiter 260 then determines the capabilities of the first caller and the second caller, a source video signal and switches the call to a video-on-hold status. In the video-on-hold status, the video on hold arbiter provides a video signal to the caller on hold from the determined source video and matching the capabilities of the party on hold. The video on hold arbiter 260 and monitors for an off hold signal. Once the off hold signal is detected, the video on hold arbiter 260 reestablishes the video and audio connections between the parties. The video on hold arbiter 260 is described in more detail below with rooms to FIG. 3 and FIGS. 6A-6C.

Referring now to FIG. 2B, a block diagram of a switch architecture according to one embodiment of the present invention is shown. In this embodiment, switch 130 is configured to implement features or functions of the present invention. Switch 130 includes a processor 270. The processor 270 can be a conventional processing device, such as a general-purpose microprocessor.

Switch 130 also includes a memory 280. The memory 280 also includes software and routines (not shown) conventionally used to operate a switch in a VoIP telephony system 195. For example, the switch 130 includes software routines for performing call monitoring, transferring calls, placing calls on hold, establishing hunt groups, automated attendant functions, etc. The memory 280 also includes program instructions or functional units that implement the features of the present invention. Specifically, the memory 220 includes the video on hold arbiter 260. The video on hold arbiter 260 has the same functionality as that described above where the video on hold arbiter 260 is located within the server 110, only that the video on hold arbiter 260 is operational as part of the switch 130. The video on hold arbiter 260 is described in more detail below with rooms to FIG. 3 and FIGS. 6A-6C.

Figure 3:
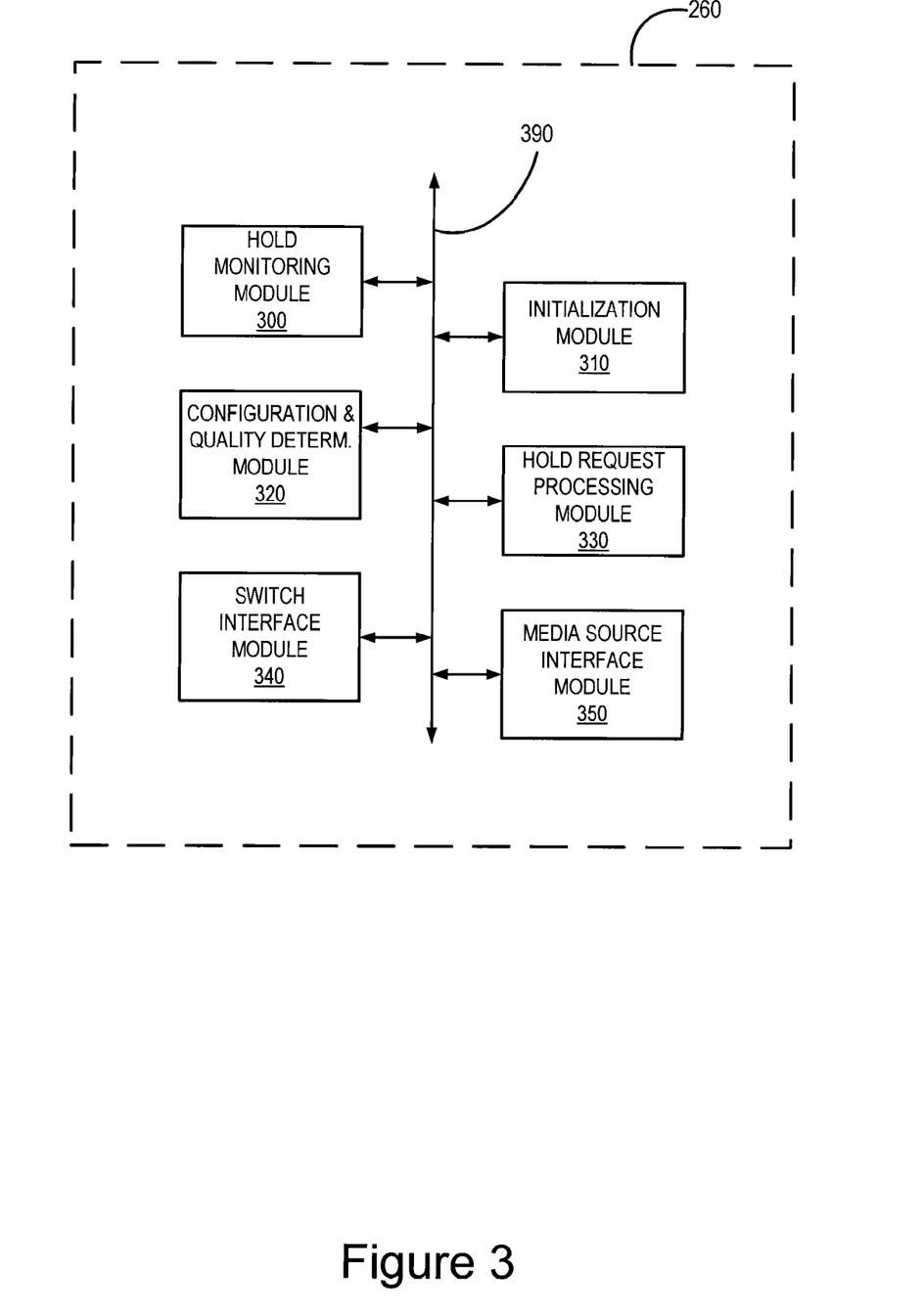
FIG. 3 is a block diagram illustrating a functional view of video on hold (VOH) arbiter according to one embodiment of the present invention.

Referring now to FIG. 3, one embodiment of the video on hold arbiter 260 is shown. The video on hold arbiter 260 comprises a hold monitoring module 300, an initialization module 310, a configuration and quality determination module 320, a hold request processing module 330, a switch interface module 340 and a media source interface module 350. These components cooperate together to provide the functionality of the present invention. The operation of these modules 300, 310, 320, 330, 340 and 350 can also be better understood with reference to FIGS. 6A-6C below in addition to the description that follows.

The hold monitoring module 300 is software and routines for determining whether a caller has input a signal requesting utilization of the video on hold functionality. In one embodiment, the hold monitoring module 300 interfaces with the call manager 150 to determine whether any requests for video on hold has been received from an endpoint. The hold monitoring module 300 is adapted for communication with the call manager 150 by a signal line 390. The hold monitoring module 300 is advantageously able to identify when a request for video on hold has been received, the parties on the call, a first party (holder) that selected video and hold, and one or more other parties (holdee) that have been placed on hold. The hold monitoring module 300 is also adapted for communication with the hold request processing module 330 to provide information about the holder and holdee.

The initialization module 310 is software and routines for initializing operation of the video on-hold functionality. The initialization module 310 is coupled by signal line 390 to the other modules 300, 320, 330, 340 and 350 for initializing their operation. The initialization module 310 is also coupled to signal line 390 for communication with the call manager 150 to enable specific endpoints so that they are able to utilize the video on hold functionality. In one embodiment, initialization of different endpoints includes enabling an endpoint to use video on hold functionality and set user and system preferences for providing video. For example, the user or system administrator may specify a video source to be used with video on hold operations for the user. This may include both the specification of a media source 160 as well as the type of media (e.g., streaming video, taped video, still images, etc.) that should be delivered. The initialization module 310 also identifies the media sources and which content is to be used for whom.

The configuration and quality determination module 320 is software and routines for determining the video display and communication capabilities of each party to a call. Once the hold monitoring module 300 has identified a holder and one or more holdee(s), the endpoints utilized by the holder and holdee(s) are identified and measured. In one embodiment, the configuration and quality determination module 320 determines the video display capabilities of the endpoints. For example, the screen resolution may be determined since it may vary from a high-resolution flat-panel display to the screen of a mobile phone. The configuration and quality determination module 320 also determines a selected communication channel that will be used between the media source 160 and the holdee (and in some cases the holder), the available bandwidth of the selected communication channel between the media source 160 and the holdee. The configuration and quality determination module 320 is adapted for communication with the call manager 150 to make such determinations, and the hold request processing module 330 for use of the information for the video on hold operation.

The hold request processing module 330 is software and routines for processing a hold request. Processing a hold request includes: receiving and processing a signal from the hold monitoring module 300 indicating a user has requested a video on hold operation, interacting with the configuration and quality determination module 320 to determine the capabilities of the endpoint, controlling the switch interface module 340 to place the callers on hold, and controlling the media source interface module 350 to deliver video content to the callers on hold. The operation of the hold request processing module 330 is described in more detail below with reference to FIG. 6A-6C. The hold request processing module 330 is coupled to signal line 390 for communication with the other modules this 300, 310, 320, 340 and 350.

The switch interface module 340 is software and routines for communicating with and controlling the switch 130. The switch interface module 340 is coupled by signal line 390 to the switch 130 and the server 110. The switch interface module 340 allows the video on hold arbiter 260, and more particularly the hold request processing module 330, to control the switch 130 to place a caller on hold, to remove a caller from hold status, to connect the media source 160 to caller, to identify parties to call, and to perform other operations relating to connecting, reconnecting and disconnecting callers and their associated computing systems from one another.

The media source interface module 350 is software and routines for allowing the hold request processing module 330 to control the media source 160. The media source interface module 350 allows the hold request processing module 330 to specify which of a plurality of different media sources (See FIG. 5) will be provided by the media source 160. The media source interface module 350 also allows the hold request processing module 330 to specify the format and resolution of the video information provided by the media source 160. The media source interface module 350 is coupled to signal line 390 for communication with the hold request processing module 330 and the media source 160.

Figure 4:
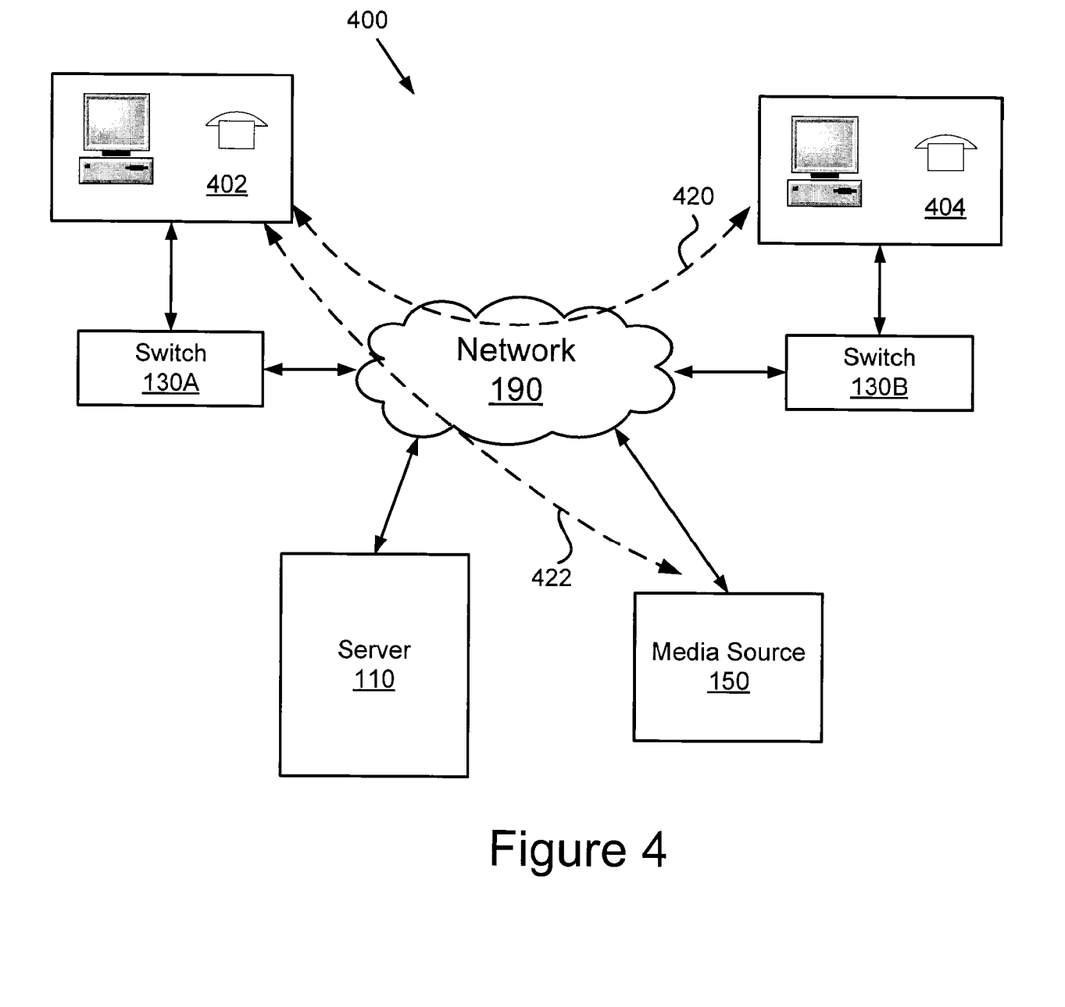
FIG. 4 is a functional block diagram showing an example of connections terminated and created during a transition of state from on-hold to off-hold and vice versa according to one embodiment of the present invention.

Referring now to FIG. 4, an example of a distributed telephony system 400 utilizing the present invention is shown. In particular, FIG. 4 shows a diagram illustrating an example with a first caller 402 communicating with a second caller 404 and how the present invention switches to and from a video on hold status. As shown in FIG. 4, the first caller 402 has a system that includes a computer for displaying video and a handset for audio input and output. Similarly, the second caller 404 has a system that includes a computer for splitting video in a handset for audio input and output. These system configurations are provided only by way of example, and those skilled in the art will recognize that there are a variety of other configurations for the systems of the first caller 402 and second caller 404. Initially, a call is established between the first caller 402 and the second caller 404. This call could be audio only, video only, or both video and audio. The call is represented by dashed line 420. If the call is audio only, communication is between the handset of the first caller 402 and the handset of the second caller 404. If the call is video only, interactive live video can be transmitted between the computer of the first caller 402 and the computer of the second caller 404 with video from the computer of the first caller 402 displayed on the computer of the second caller 404, and vice versa. Once the second caller 404 selects a video on hold operation, the first caller 402 is placed on hold, and video is delivered from the media source 160 to the computer of the first caller 402 as indicated by the dashed line 422. In one embodiment, the media source 160 is also coupled to the computer of the second caller 404 to deliver video content. In an alternate embodiment, the second caller 404 continues to receive the images transmitted by the computer of the first caller 402. Once the second caller 404 cancels or deselects the video of hold operation, the call and the state of video transmission is returned to its original state prior to selection of the video on hold operation in which the first caller 402 receives video from the second caller 404 and vice versa as indicated by dashed line 420.

Those skilled in the art will recognize that the example of FIG. 4 represents the simplest of cases, and that the present invention includes a variety of alternate embodiments. In one embodiment, the user putting another caller on hold is at an operator or front desk terminal. In this case, the video source utilized may be from a video server that provides information about the company's products or services. In another embodiment, users may be associated with a particular department or group. In this case, the video source utilized may include targeted messaging and maybe from a streaming video server. For example, a person in a human resources department may automatically provide videos on insider trading or sexual-harassment when they place a user on hold. In yet another embodiment, the present invention may be operational in a scenario where multiple users are engaged in a phone conference that includes video. In this case, the system of each user displays a window with multiple panes, each pane showing an image of the other parties on the video conference call. When a user selects the video on hold operation, each of the other remaining users receives video content from the media source 160 in the pane where the user that selected the video on hold operation was previously displayed.

Figure 5:
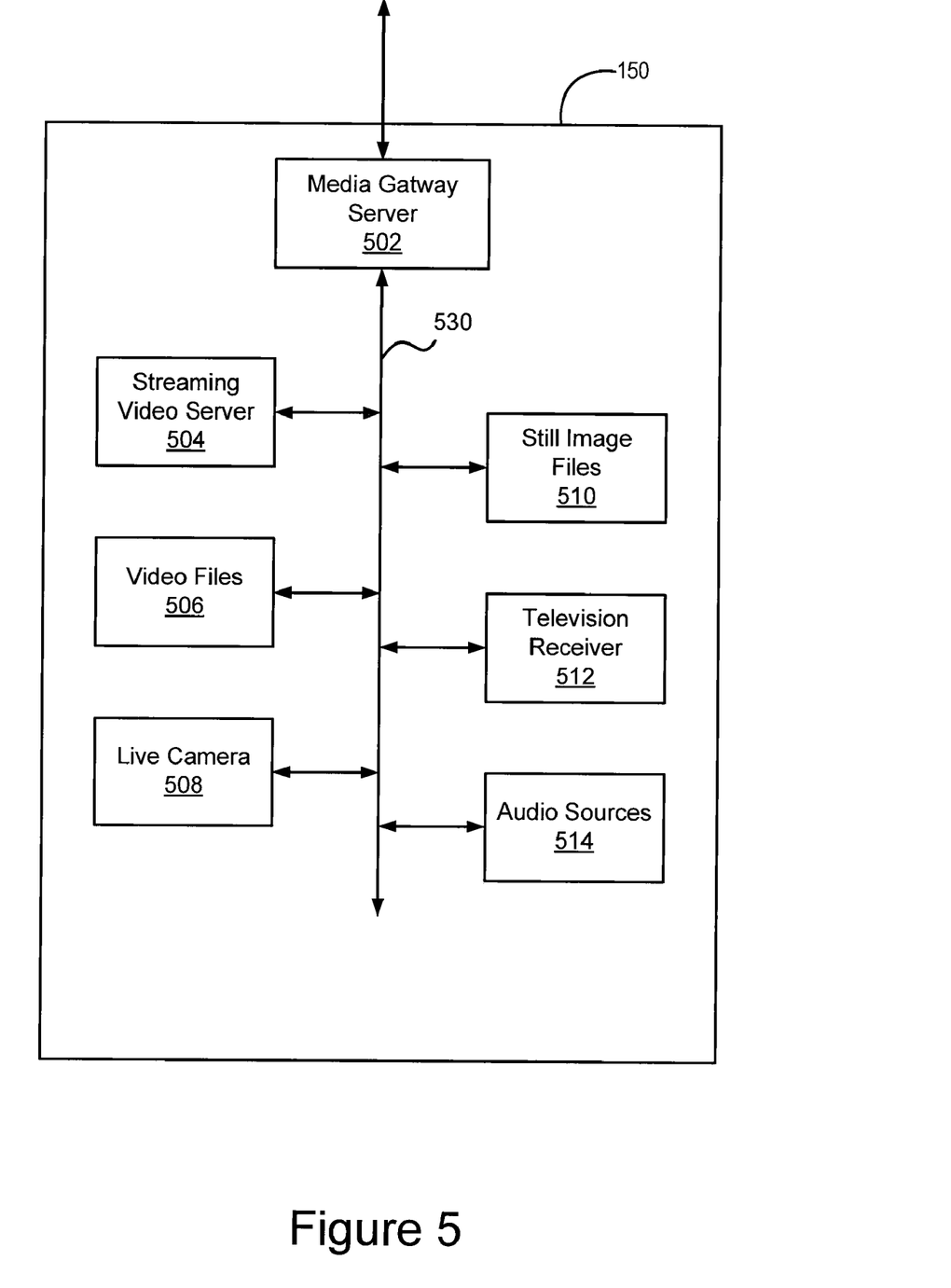
FIG. 5 is a block diagram representing a media source according to one embodiment of the present invention.
Figure 6A:
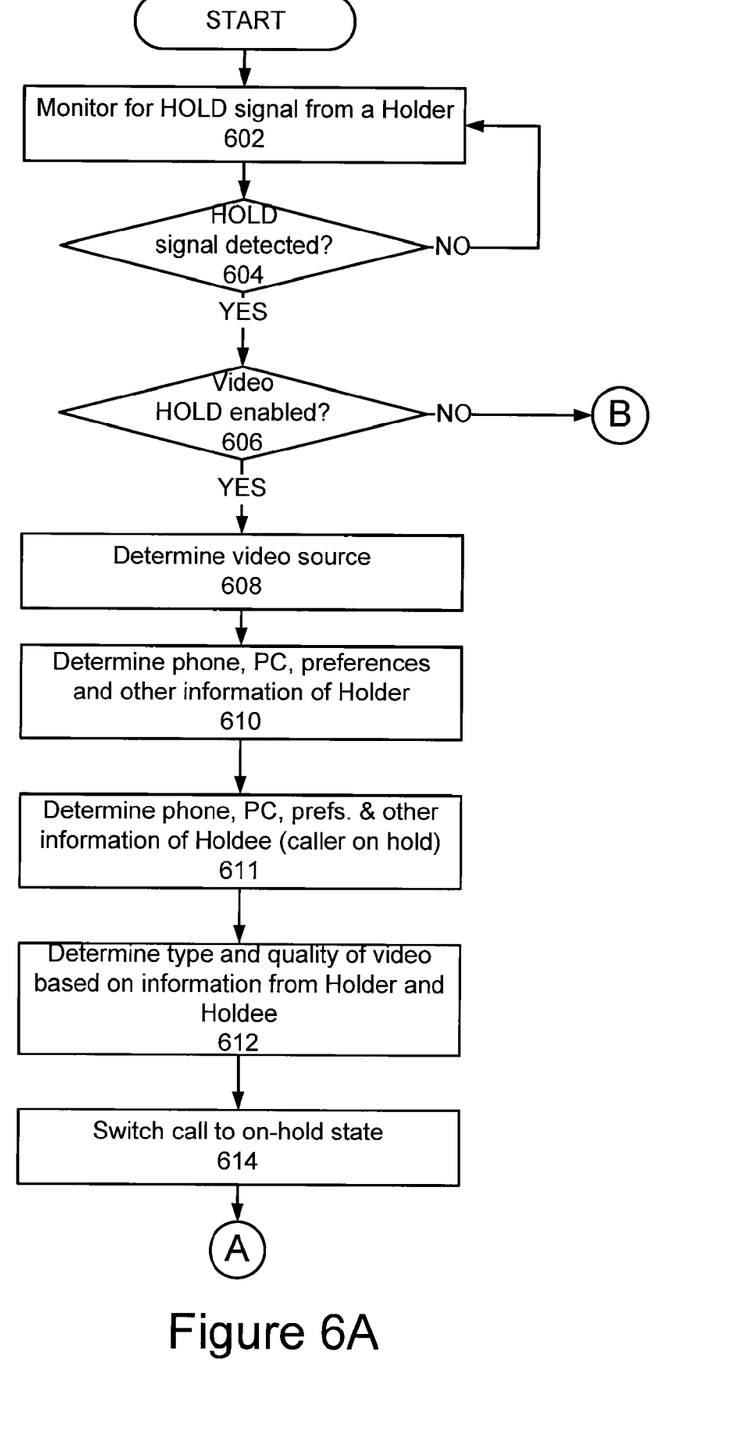
FIGS. 6A, 6B and 6C are a flowchart illustrating a functional view of a prediction retrieval module according to one embodiment of the present invention.

Referring now to FIG. 5, an embodiment of the media source 160 is shown as comprising a media gateway server 502, a streaming video server 504, video files 506, video from a live camera 508, still image files 510, video output from a television receiver 512 and audio sources 514. The media gateway server 502 is a conventional server for delivering video content as will be understood to those skilled in the art. The media gateway server 502 is coupled to the network 190 as shown in FIG. 1 and to the communication bus 530. The media gateway server 502 is adapted for communication and control by the video on hold arbiter 260 such that the media gateway server 502 is capable of delivering information content from any of the sources 504, 506, 508, 510, 512 and 514 coupled to the communication bus 530. The source of the video media does not need to be in a specific format. The media gateway server 502 will interface with a video format converter (not shown) which will convert the video source to the appropriate video format(s) being used with the communication system. The video source may or may not be associated with an audio stream. In the case of video sources associated with an audio source, the audio streams associated with a video source will replace the telephony system music on hold. The streaming video server 504, the video files 506, camera 508, still image files 510, television receiver 512 and audio sources 514 are of conventional types as will be known to those skilled in the art. Those skilled in the art will also understand that other sources of video and audio may be coupled to communication bust 530. While the media source 160 is shown as including a plurality of media sources, those skilled in the art will recognize that the media source 160 can be a single source with a video on hold arbiter 260 retrieving the media to be played.

Methods

Figure 6B:
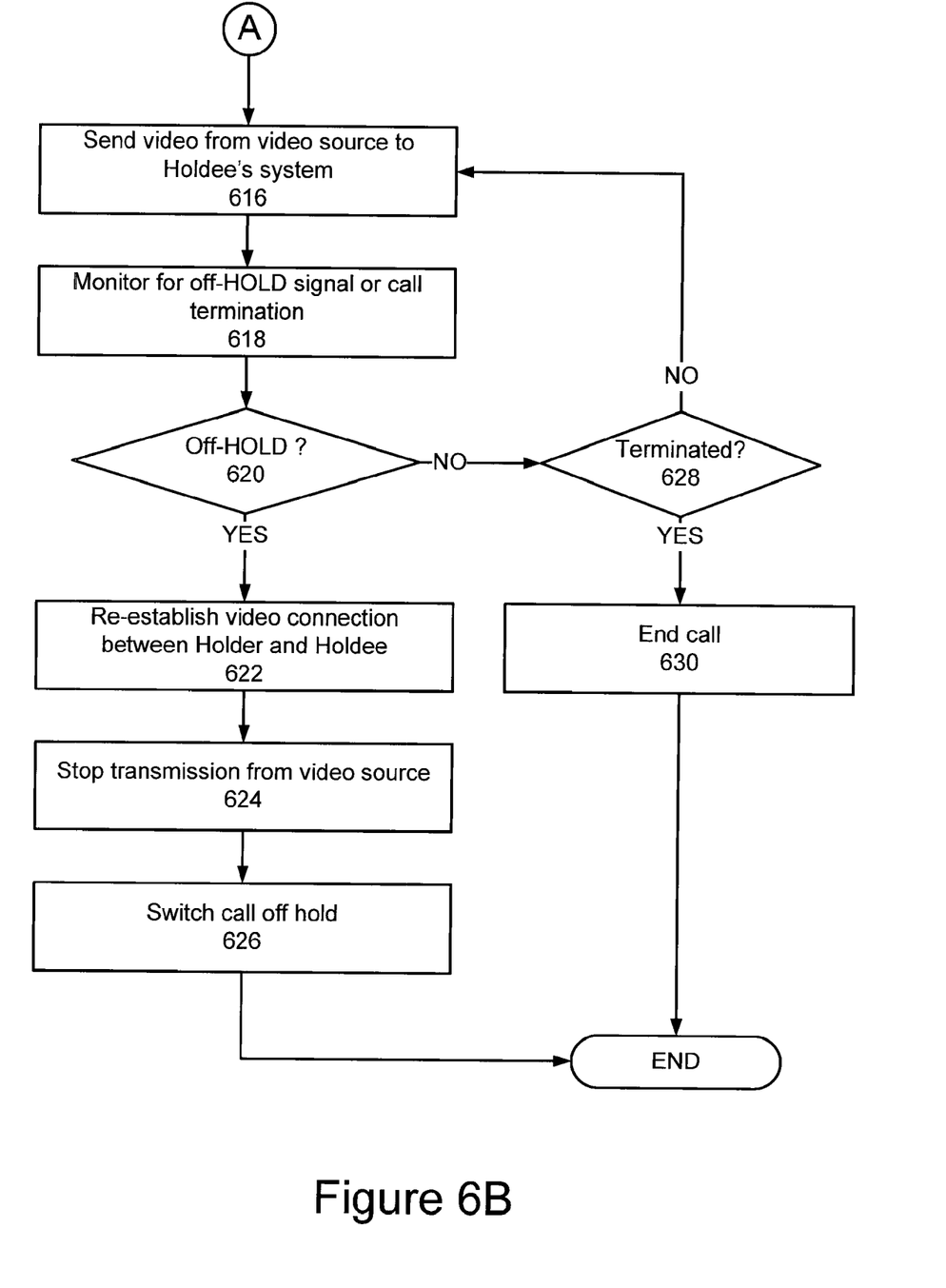
Figure 6C:
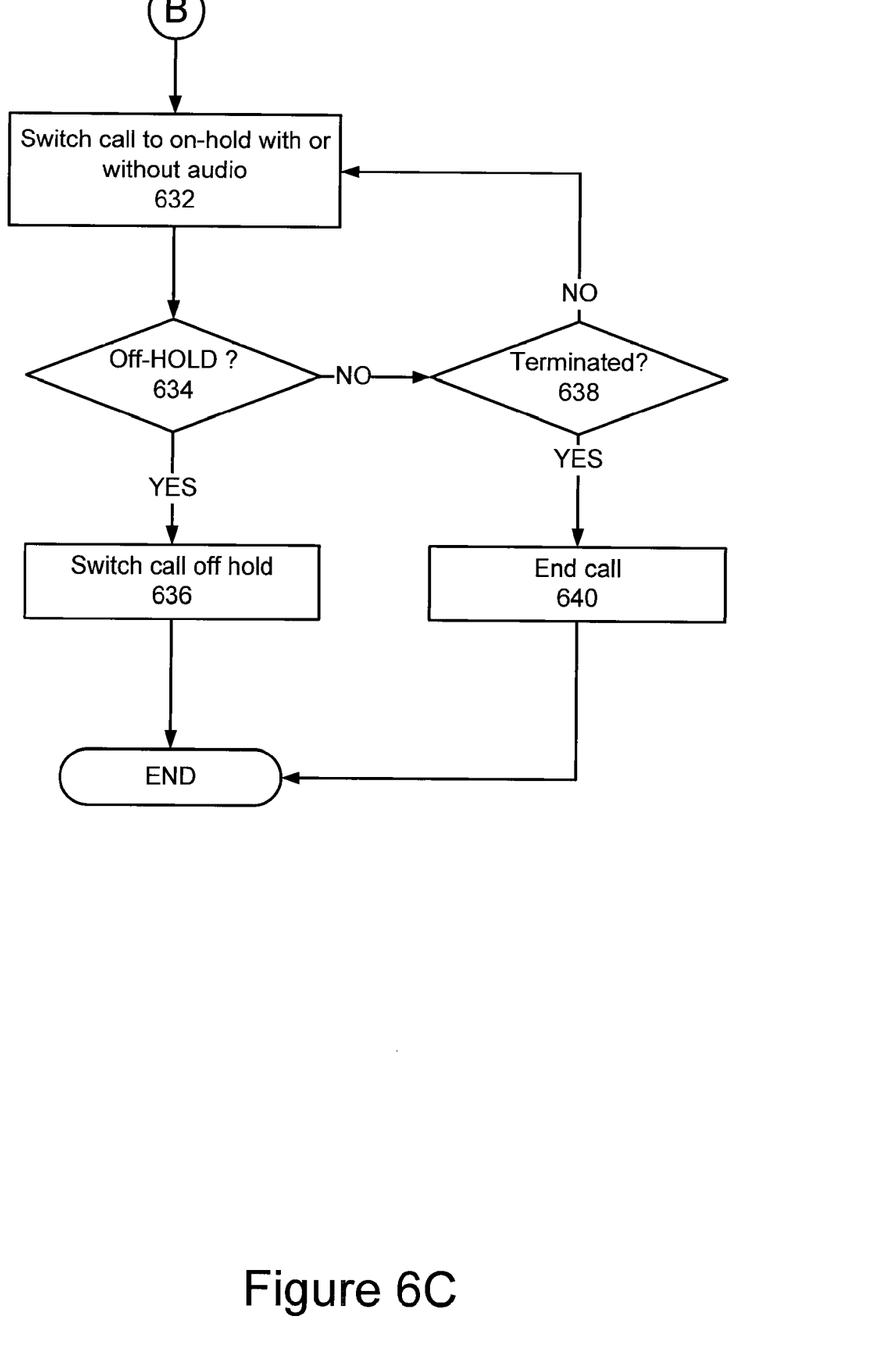

Referring now to FIGS. 6A, 6B and 6C, a method for performing video on hold is shown. Referring now to FIG. 6A, the method begins by monitoring 602 for a HOLD signal from a holder. Next, the method determines 604 whether the HOLD signal has been detected. If not, the method returns to step 602 to continue to monitor for a HOLD signal from a holder. If the method detected a HOLD signal in step 604, the process continues to determine 606 whether video hold functionality has been enabled.

If the video functionality has been enabled, the process continues to determine 608 a video source. The present invention advantageously provides video from anyone of a plurality of sources. As was just described, the media source 160 includes a media gateway server 502 that is coupled to a plurality of different sources such as but not limited to a video streaming server 504, video files 506, a live camera 508, mass communication receivers 512, still image files 510 and audio sources 514. Furthermore, there may be a plurality of media sources 160. The video on hold arbiter 260 advantageously can control the video context based on a number of different factors. For example, the video content provided may be determined by a user ID, a user's group, a user's function, the recipient of the video content, etc. In one embodiment, the video source is determined according to characteristics of user. In another embodiment, the video source is determined using characteristics of the recipient. In yet another embodiment, the source of the video is based on caller location and/or caller a location. Those skilled in the art will recognize that anyone of the above factors or combinations of these factors can be used to determine the source of the video content.

Next, the method determines 610 the capabilities of the phone, the computing device, preferences and other information of the holder (the caller placing other caller(s) on video hold). Here capabilities refers to capabilities, characteristics like location or language of the computing devices, communication links, preferences, and any other information that affects the communication to or from the phone and display of the holder. Then the method determines 611 capabilities of the phone, the computing device, the preferences and other information of the holdee (one or more callers on video hold). This similary includes any information other information that affects the communication to or from the phone and display of the holdee. Then the method determines 612 the type and quality of video to deliver based on information about the holder and the holdee(s). In one embodiment, this step is performed by the configuration and quality determination module 320. The present invention is particularly advantageous because the video on hold arbiter 260 customizes the video content delivered based on the information gathered about the holder and the holdee from steps 610 and 611. For example, different video content may be selected based on language which may be a preference of the holdee. Similarly, different kinds of video content based on the holdee's system are delivered. For example, the holdee's system may dictate a low resolution format, may allow a high resolution format for the video content, may require specific screen format, or maybe require a thin client for mobile devices. The holdee's system may even dictate whether video content can be delivered at all or whether the system is limited to audio.

In yet another embodiment, the information gathered about the holder and the holdee from steps 610 and 611 is used to deliver the content in the most efficient manner. In other words, the determination made in step 612 takes into account which media source 160 will be used, and its connections to the holdee's system. The preferred embodiment of the present invention is in a distributed telephony system. In such a system, there may be a plurality of distributed media sources 160. These media sources can be located at varying distances from and with varying connections speeds and types to the holdee. The video on hold arbiter 260 considers these factors and selects the most effective media source and communication channel in which to deliver the video content to the holdee's system. For example, the video on hold arbiter 260 selects the media source based on location, backup resources, communication channel, demand upon a particular resource and other criteria as the will be understood to those skilled in the art. In still another embodiment, the video on hold arbiter 260 is interactive and adaptive. Thus, during the time when a particular holdee is in the video on hold status, the video on hold arbiter 260 may switch between different media sources to provide the video content.

Once a video type, quality and source have been determined 612, then the method switches 614 the call to an on-hold status. Referring now also to FIG. 6B, the method sends 616 the video content from the media source 160 to the holdee's system. Next, the method monitors 618 for an off-hold signal or call termination. Next the method determines 620 whether an off-hold signal has been received. If not, the method determines 628 whether the call has been terminated. If the call has not been terminated the method loops back to step 616 and 618 to send video to the Holdee's system and monitor for an off-hold signal. If the method determined in step 628 that the call was terminated, the method ends 630 the call and the video on hold operation is complete.

If the method determined in step 620 that an off-hold signal was received, the method reestablishes 622 the video connection between the holder and holdee. Then transmission of video from the video source is terminated 624, and the call is switched 626 off hold and the method is complete.

If the method determined in step 606 that video hold was not enabled, the method transitions from step 606 to step 632 of FIG. 6C. In step 632, the method switches the call to an on-hold status with or without audio in a conventional manner. Since video on hold is not enabled, the system 195 of the present invention defaults to a conventional on hold system where audio content is provided based on the preferences set by the user. The method determines 634 whether an off hold signal has been received and determines 638 whether the call has been terminated. If neither of these events has occurred, the method returns to step 632. If it is determined in step 634 that an off-hold signal has been received, the call is switched 636 off hold and the process is complete. If the method determines in step 638 that the call was terminated, the method ends 640 the call and the method is complete.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method implemented by a processor for delivering video to a first system placed on hold by a second system, the method comprising:
identifying the first system on hold;
determining a preference of a user of the first system;
determining whether video on hold functionality is enabled for the first system;
determining, when the video on hold functionality is enabled, a video source using information associated with a user of the second system, the information including one or more of a group for the user and a function of the user;
determining, when the video on hold functionality is enabled, a quality of video using the determined preference of the user of the first system;
switching the first system onto a hold status;
sending, when the video on hold functionality is enabled, video from the determined source to the first system when the first system is on the hold status; and
sending, when the video on hold functionality is not enabled, audio information to the first system when the first system is on the hold status.

2. The method of claim 1 further comprising a step of monitoring for an on hold signal from the second system.

3. The method of claim 1 further comprising:
determining a capability of the first system; and
determining a quality of video using the determined capability of the first system.

4. The method of claim 1 further comprising:
determining a type of the first system; and
determining a quality of video using the determined type of the first system.

5. The method of claim 1 further comprising:
determining a capability of the first system;
determining a capability of the second system; and
determining a quality of video for sending from the determined source to the first system using the determined capability of the first system and the determined capability_of the second system.

6. The method of claim 1 wherein the video source is one from the group of a streaming video server, a video file, video from a live camera, a still image file and video output from a television receiver.

7. The method of claim 1, further comprising:
reconnecting the first system with the second system for video communication; and
switching the first system off hold status.

8. The method of claim 7, further comprising a step of monitoring for an off hold signal from the second system.

9. An apparatus for placing a call on video hold comprising:
a hold monitoring module for monitoring for a hold signal from a first system;
a configuration and quality determination module for determining a preference of a user of a second system, determining video display and communication capabilities of the second system including whether a video on hold functionality is enabled for the second system and, responsive to determining the video on hold functionality is enabled for the second system, determining a quality of video using the determined preference of the user of the second system;
a media source interface module for controlling a media source to provide video information when the video on hold functionality is enabled and the second system is on hold and to provide audio information when the video on hold functionality is not enabled and the second system is on hold;
a switch interface module for communicating with and controlling a switch to couple the first system, the second system and the media source, the switch interface module coupled to the switch; and
a hold request processing module for processing the hold signal from the hold monitoring module, the hold request processing module switching communication between the first system and the second system to communication between the media source and the second system, the hold request processing module adapted for communication with the switch interface module, the configuration and quality determination module, the media source interface module and the hold monitoring module, the hold request processing module for determining the media source using (1) information associated with a user of the first system, the information including one or more of a group for the user and a function of the user, (2) whether the video on hold functionality is enabled for the second system, and (3) responsive when the video on hold functionality is enabled for the second system, the determined quality of video.

10. The apparatus of claim 9, wherein the configuration and quality determination module also determines video display and communication capabilities of the first system, and the hold request processing module controls the media source to deliver video content according to the determined capabilities of the second system and the first system.

11. The apparatus of claim 9, wherein the media source interface module is capable of controlling the media source to deliver one from the group of a streaming video server, a video file, video from a live camera, a still image file or video output from a television receiver.

12. A system for placing a call on video hold, the system comprising:
a first endpoint corresponding to and enabling communication with a first caller;
a second endpoint corresponding to and enabling communication with a second caller;
a media source for providing video content when a video on hold functionality is enabled for the second endpoint and the second endpoint is on hold and to provide audio information when the video on hold functionality is not enabled for the second endpoint and the second endpoint is on hold; and
a video on hold arbiter for processing a hold signal and switching communication between the first endpoint and the second endpoint to communication between the media source and the second endpoint, the video on hold arbiter coupled to the first endpoint, the second endpoint and the media source, the video on hold arbiter determining a preference of the second caller and video display and communication capabilities of the second endpoint including whether the video on hold functionality is enabled for the second endpoint, the video on hold arbiter determining, responsive to determining the video on hold functionality is enabled for the second endpoint, a quality of video using the determined preference of the second caller and the video content using information associated with the first caller, the information including one or more of a group for the first caller and a function of the first caller.

13. The system of claim 12, wherein the video on hold arbiter is part of a telephony switch.

14. The system of claim 12, wherein the video on hold arbiter is part of a telephony server.

15. The system of claim 12, wherein the media source includes a media gateway server for delivering content from a streaming video server, a video file, video from a live camera, a still image file or video output from a television receiver.

* * * * *